US011896129B2

(12) United States Patent
Freelend et al.

(10) Patent No.: US 11,896,129 B2
(45) Date of Patent: Feb. 13, 2024

(54) BEDDING FOUNDATION HAVING ROLLER MOVABLE FOR MASSAGE EFFECT

(71) Applicant: L&P Property Management Company, South Gate, CA (US)

(72) Inventors: Isaac T. Freelend, Reeds, MO (US); Jacob J. Neuenswander, Carthage, MO (US); Jason J. Stokesbary, Oronogo, MO (US)

(73) Assignee: L&P Property Management Company, South Gate, CA (US)

( * ) Notice: Subject to any disclaimer, the term of this patent is extended or adjusted under 35 U.S.C. 154(b) by 46 days.

(21) Appl. No.: 17/167,402

(22) Filed: Feb. 4, 2021

(65) Prior Publication Data

US 2021/0321784 A1 Oct. 21, 2021

Related U.S. Application Data

(60) Provisional application No. 63/012,989, filed on Apr. 21, 2020.

(51) Int. Cl.
*A61G 7/018* (2006.01)
*A61H 15/00* (2006.01)
(Continued)

(52) U.S. Cl.
CPC ............ *A47C 19/021* (2013.01); *A61G 7/018* (2013.01); *A47C 21/006* (2013.01); *A61H 15/00* (2013.01); *Y10S 5/933* (2013.01); *Y10S 5/934* (2013.01)

(58) Field of Classification Search
CPC ....... A47C 19/00; A47C 19/005; A47C 19/02; A47C 19/021; A61G 7/018; Y10S 5/933;
(Continued)

(56) References Cited

U.S. PATENT DOCUMENTS 4,947,833 A * 8/1990 Yamasaki .......... A61H 15/0078 601/102
5,088,475 A * 2/1992 Steffensmeier .... A61H 15/0078 601/102
(Continued)

FOREIGN PATENT DOCUMENTS

CN 201227396 Y * 4/2009
FR 2690619 A1 * 11/1993 ............. A61G 7/012
GB 2174596 A * 11/1986 ............. A61G 7/002

OTHER PUBLICATIONS

"Definition of Hollow." Merriam-Webster Dictionary, Aug. 5, 2023, www.merriam-webster.com/dictionary/hollow. (Year: 2023).*

*Primary Examiner* — Justin C Mikowski
*Assistant Examiner* — Deborah Talitha Gedeon
(74) *Attorney, Agent, or Firm* — Wood Herron & Evans, LLP

(57) ABSTRACT

A bedding foundation has a linear actuator for moving a roller carriage forward and backwards. The roller carriage includes wheels which move along rails supported below a rigid platform having an opening extending through the platform. The roller carriage includes a lifter which raises and lowers a roller independently of the movement of the linear actuator. Regardless of the position of the linear actuator, the roller may be raised or lowered. The roller moves back and forth inside the opening extending through the rigid platform and imparts a massage movement to a mattress above the foundation.

21 Claims, 17 Drawing Sheets

(51) Int. Cl.
*A47C 21/00* (2006.01)
*A47C 19/02* (2006.01)

(58) Field of Classification Search
CPC . Y10S 5/934; Y10S 5/944; A61H 2201/0142; A61H 15/00; A61H 2015/0014; A61H 15/0078; A61H 2201/149; A61H 2015/0064; A61H 2015/0071; A61H 2015/0007; A61H 2015/0021
See application file for complete search history.

(56) References Cited

U.S. PATENT DOCUMENTS

| | | | | |
|---|---|---|---|---|
| 6,454,731 | B1 * | 9/2002 | Marcantoni | A61H 7/007<br>601/99 |
| 2005/0010143 | A1 * | 1/2005 | Kim | A61H 15/02<br>601/99 |
| 2019/0223609 | A1 * | 7/2019 | Sherman | A47C 27/14 |

* cited by examiner

BEDDING FOUNDATION HAVING ROLLER MOVABLE FOR MASSAGE EFFECT

CROSS-REFERENCE TO RELATED APPLICATIONS

This application claims the benefit of priority to U.S. Provisional Patent Application Ser. No. 63/012,989 filed Apr. 21, 2020 , the disclosure of which is incorporated by reference herein in its entirety.

FIELD OF THE INVENTION

This invention relates generally to a bedding foundation having a lift actuator and linear actuator to move a roller or similar apparatus to impart a massage effect on a mattress above the foundation.

BACKGROUND OF THE INVENTION

In the bedding industry, bases or foundations for supporting mattresses fall into two categories: 1) stationary foundations, which do not have any moving parts, and 2) adjustable bed bases which are usually motorized and have moving parts for inclining a portion of a mattress resting on the adjustable bed base and sometimes vibrating a portion of a mattress resting on the adjustable bed base.

Commonly adjustable bed bases include one or more motors which activate one or more drivers of the adjustable bed base to raise a portion of the bed base and mattress. In addition, such adjustable bed bases may include one or more vibratory motors which may impart vibrations to the mattress for a "massage" type effect or feel. Consequently, due to the hardware and electronics necessary to move a portion of an adjustable bed base, the adjustable bed base may be heavy and difficult to transport. Conventional stationary bedding foundations are commonly much lighter and easier to transport.

Adjustable bed bases are typically more expensive than conventional stationary bedding foundations because they have one or more motors for moving parts. Thus, a need exists in the bedding industry for a bedding foundation which combines desirable features of both adjustable bed bases and conventional standard bedding foundations.

SUMMARY OF THE INVENTION

According to one aspect of the invention, a bedding foundation comprises a generally rectangular frame supported by legs and a rigid platform supported by the generally rectangular frame. The rigid platform has an opening covered by a cover. The cover is conventionally secured to the rigid platform.

Two roller rails are secured to a lower surface of the rigid platform. The roller rails extend from head to foot and are generally parallel. Each of them is a unitary member having an inverted V-shaped lower portion.

The bedding foundation further comprises two uprights secured to each of the roller rails, two per side. The uprights are stationary, the same size and generally vertically oriented. Stationary cross members are secured to the uprights. Each cross member extends between two uprights and is generally horizontally oriented. A linear actuator extends between the cross members and may be remotely actuated. The linear actuator moves a bus from front to back of the bedding foundation. A roller tray bracket is secured to the bus and moves linearly with the bus.

A roller carriage is secured to the roller tray bracket and is movable by the linear actuator from front to back of the bedding foundation. The roller carriage includes a roller tray and a lifter inside the roller tray for lifting a lifter plate. The roller carriage further comprises two roller mounting brackets secured to the lifter plate. The roller extends between the roller mounting brackets. The roller carriage further comprises a chassis having two side members and two connecting members extending between the side members. Two stubs extend downwardly from each of the side members of the chassis and are secured to the roller tray. The roller carriage further comprises four wheels, two per side. Each of the wheels is mounted on a wheel pin which extends through one of the side members of the chassis. Each of the wheels has a groove therein which receives the inverted V-shaped portion of one of the stationary roller rails. When the linear actuator moves the roller carriage horizontally the wheels and stationary roller rails guide the movement of the roller carriage. The roller moves horizontally with the roller carriage but may be moved in a vertical direction by the lifter which moves with the roller carriage as well.

In a second aspect, a bedding foundation comprises a frame supported by legs and a rigid platform supported by the frame. The rigid platform has an opening covered by a flexible cover. The flexible cover is conventionally secured to the rigid platform. In some instances, the flexible cover may be omitted.

The bedding foundation further comprises a lift mechanism suspended by the rigid platform. The lift mechanism comprises roller rails secured to a lower surface of the rigid platform. The roller rails extend from head to foot and are generally parallel. Each of them is a unitary member having an inverted V-shaped lower portion.

The lift mechanism further comprises two uprights and two cross members. The uprights are the same size and generally vertically oriented. The cross members are secured to the uprights. Each cross member extends between two uprights and is generally horizontally oriented. The lift mechanism further comprises a linear actuator below the rigid platform. The linear actuator extends between the cross members and may be remotely actuated. The linear actuator moves a bus from front to back of the bedding foundation. A roller tray bracket is secured to the bus and moves linearly with the bus.

A roller carriage is operatively coupled to the linear actuator and moveable by the linear actuator from front to back of the bedding foundation. The roller carriage includes a roller tray, a chassis and a lifter secured inside the roller tray for lifting a lifter plate. The roller carriage further comprises two roller mounting brackets secured to the lifter plate. The roller extends between the roller mounting brackets. The chassis has two side members and two connecting members extending between the side members. Two chassis further comprises stubs connecting the side members of the chassis to the roller tray. The stubs extend downwardly from each of the side members of the chassis and are secured to the roller tray. The roller carriage further comprises four wheels, two per side. Each of the wheels is mounted on a wheel pin which extends through one of the side members of the chassis. Each of the wheels has a groove therein which receives the inverted V-shaped portion of one of the stationary roller rails. When the linear actuator moves the roller carriage horizontally the wheels and stationary roller rails guide the movement of the roller carriage. The roller of the roller carriage is sized to fit through the opening in the rigid platform and is movable in a horizontal direction by the linear actuator and movable in a vertical direction by the lifter which moves with the roller carriage as well.

In a third aspect, a method of providing a massaging feeling to a mattress from a massage mechanism built into a bedding foundation. The first step in the method comprises raising a roller through an opening in a rigid platform using a lifter. The roller remains below a flexible cover covering the opening in the rigid platform. The rigid platform is supported by a generally rectangular frame supported by legs.

The next step in the method is moving the roller from front to back inside the opening with the roller in its raised position by activating a linear actuator. The linear actuator extends between cross members, the cross members extending between uprights mounted to roller rails. The roller rails are mounted to the rigid platform. The linear actuator horizontally moves a bus. A roller tray bracket is secured to the bus. A roller tray of a roller carriage is secured to the roller tray bracket. The roller carriage further comprises wheels engaging the roller rails for guiding movement of the roller carriage. The lifter is inside the roller tray and lifts a lifter plate and two roller mounting brackets secured to the lifter plate when activated. The roller extends between the roller mounting brackets.

The accompanying drawings, which are incorporated in and constitute a part of this specification, illustrate embodiments of the invention and, together with the summary of the invention given above, and the detailed description of the drawings given below, explain the principles of the present invention.

DETAILED DESCRIPTION OF THE INVENTION

Figure 1:
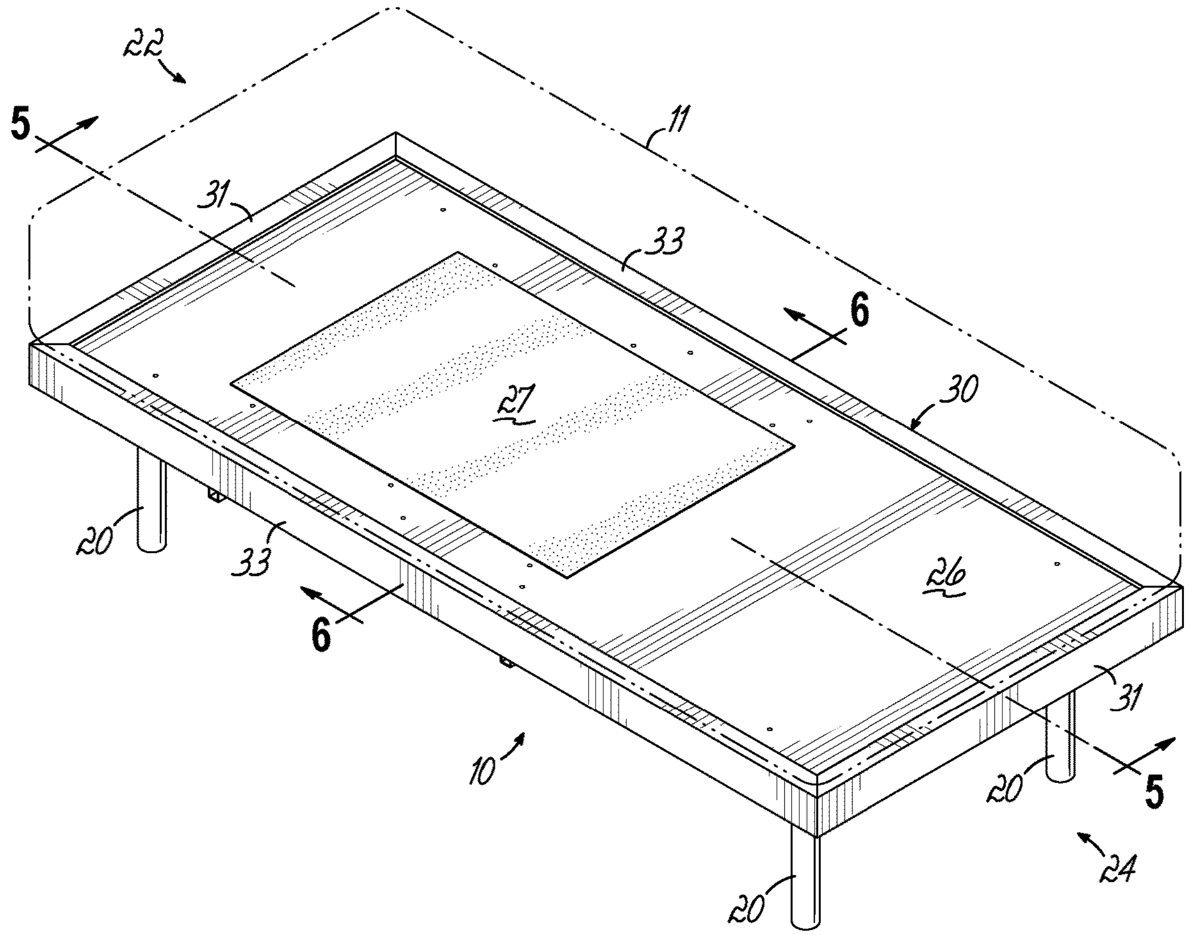
FIG. 1 is a perspective view of a bedding foundation in accordance with one embodiment of the present invention.

Referring first to FIG. 1, there is illustrated a bedding foundation 10 incorporating the principles of the present invention. As seen in FIG. 1, the bedding foundation 10 is used to support a mattress 11, shown in dashed lines. Any mattress may be supported by the bedding foundation; this document is not intended to limit the type of mattress which may be supported.

Figure 2:
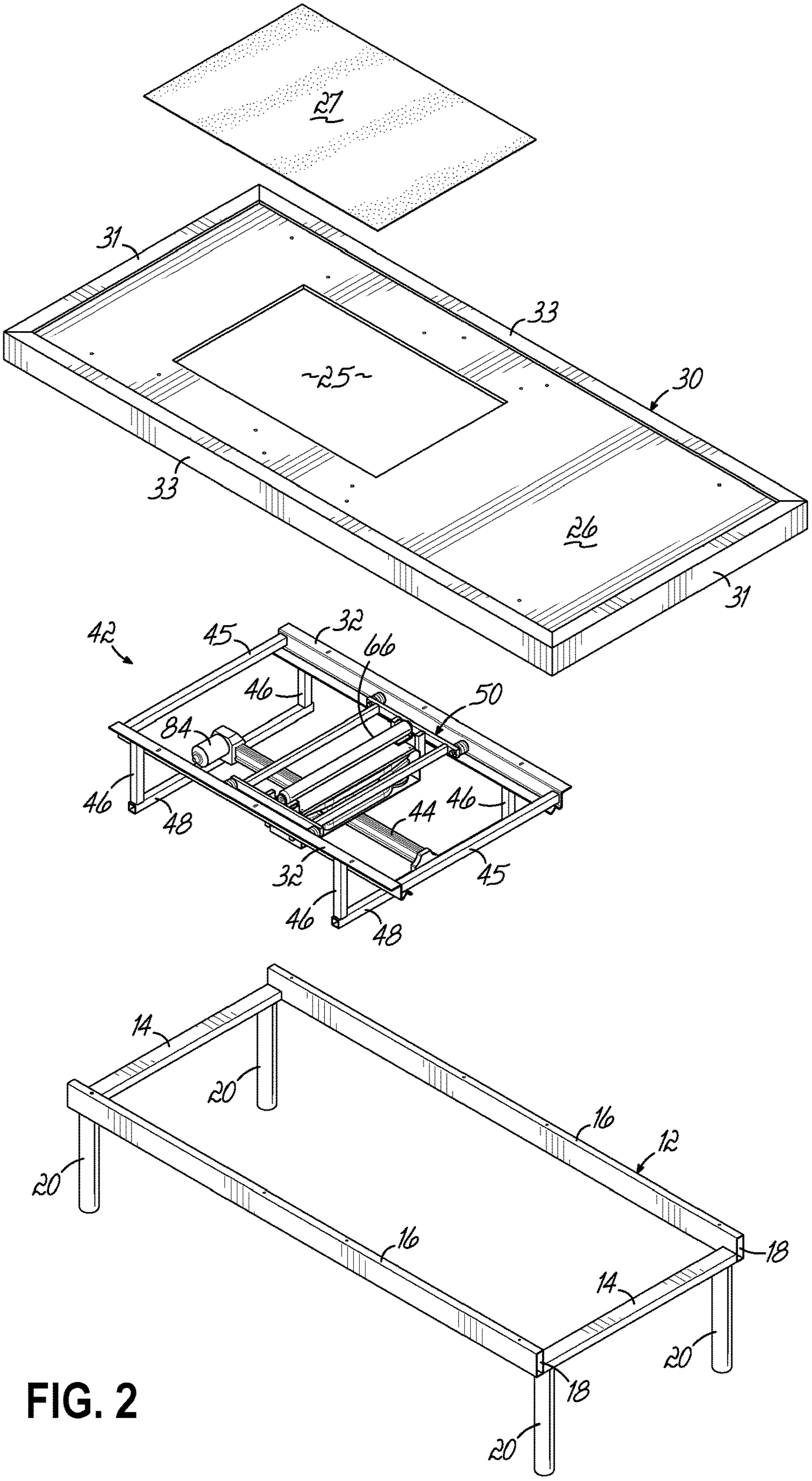
FIG. 2 is a partially disassembled view of the bedding foundation of FIG. 1.
Figure 6:
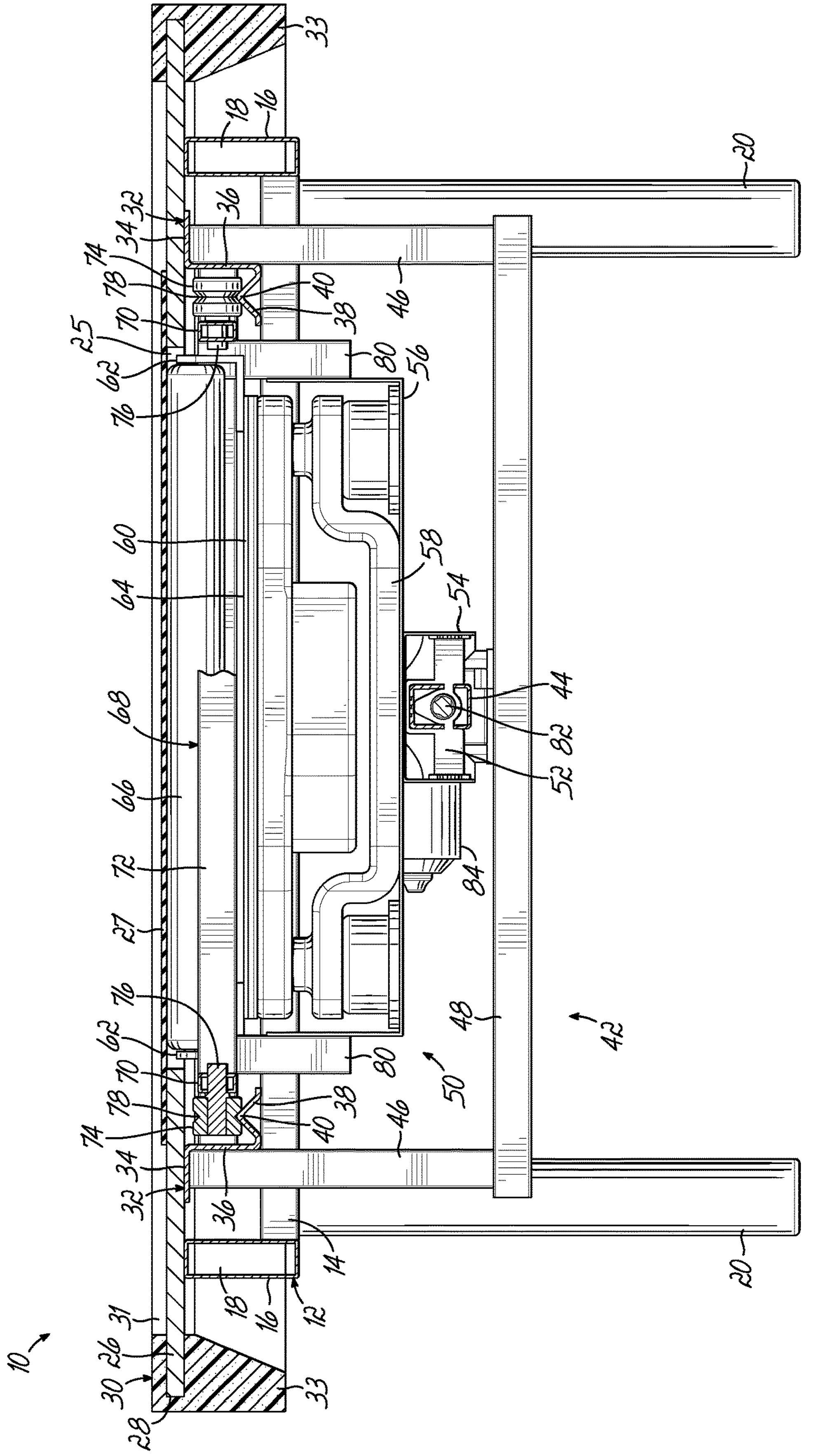
FIG. 6 is a schematic cross-sectional view taken along the line 6-6 of FIG. 1.

As best shown in FIG. 2, the bedding foundation 10 comprises a generally rectangular frame 12, comprising two end rails 14 and two side rails 16. As best shown in FIG. 2, the end and side rails 14, 16 may be secured together with any conventional means, including fasteners. As best shown in FIGS. 2 and 6, each of the end rails 14 and each of the side rails 16 has a hollow interior 18.

Legs 20 support the rectangular frame 12 above the ground a desired distance. Although the legs 20 are illustrated being secured to the end rails 14, they may be secured to any part of the generally rectangular frame 12. Although one configuration of leg is shown, the legs may be any shape or size. The present invention is not intended to limit the legs in any manner.

For purposes of this document, the head end of the bedding foundation 10 will be indicated by the numeral 22 while the foot end of the bedding foundation 10 will be indicated by the numeral 24.

Figure 4:
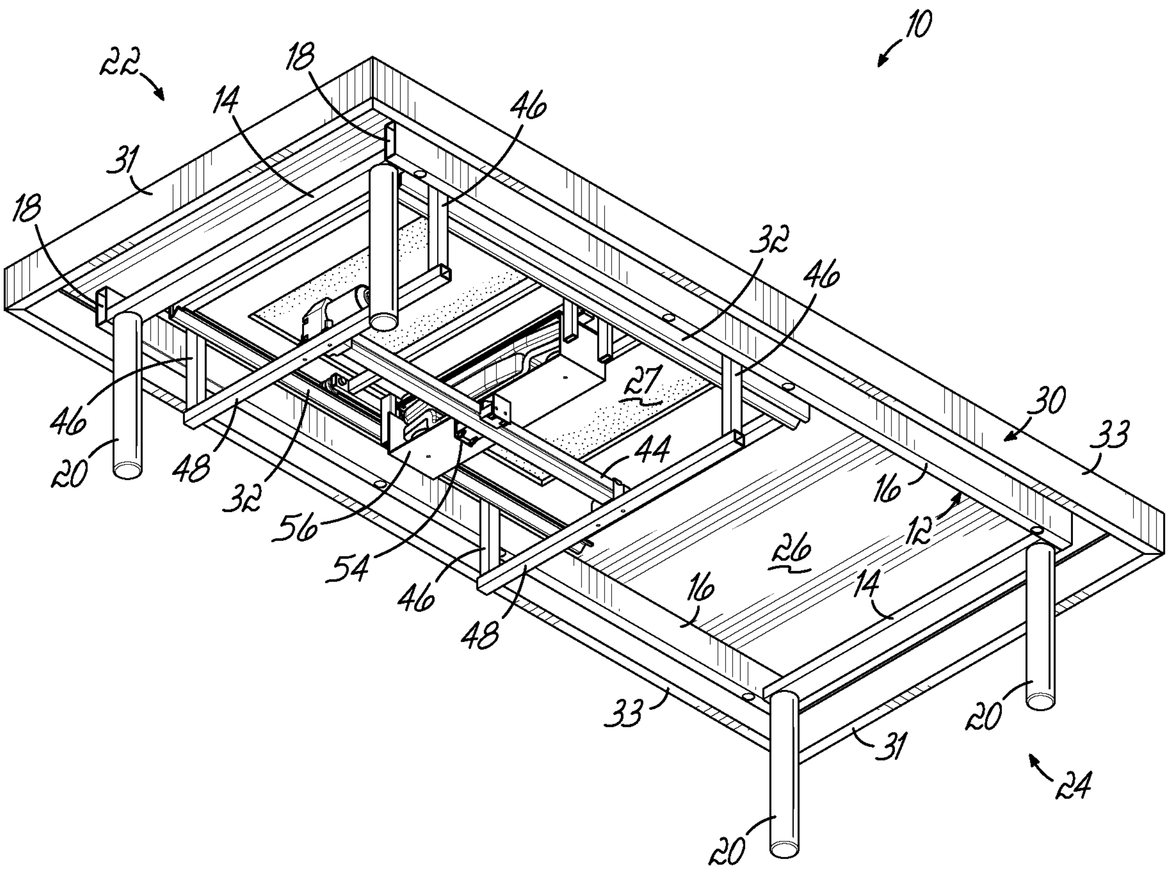
FIG. 4 is a bottom perspective view of the bedding foundation of FIG. 1.
Figure 5:
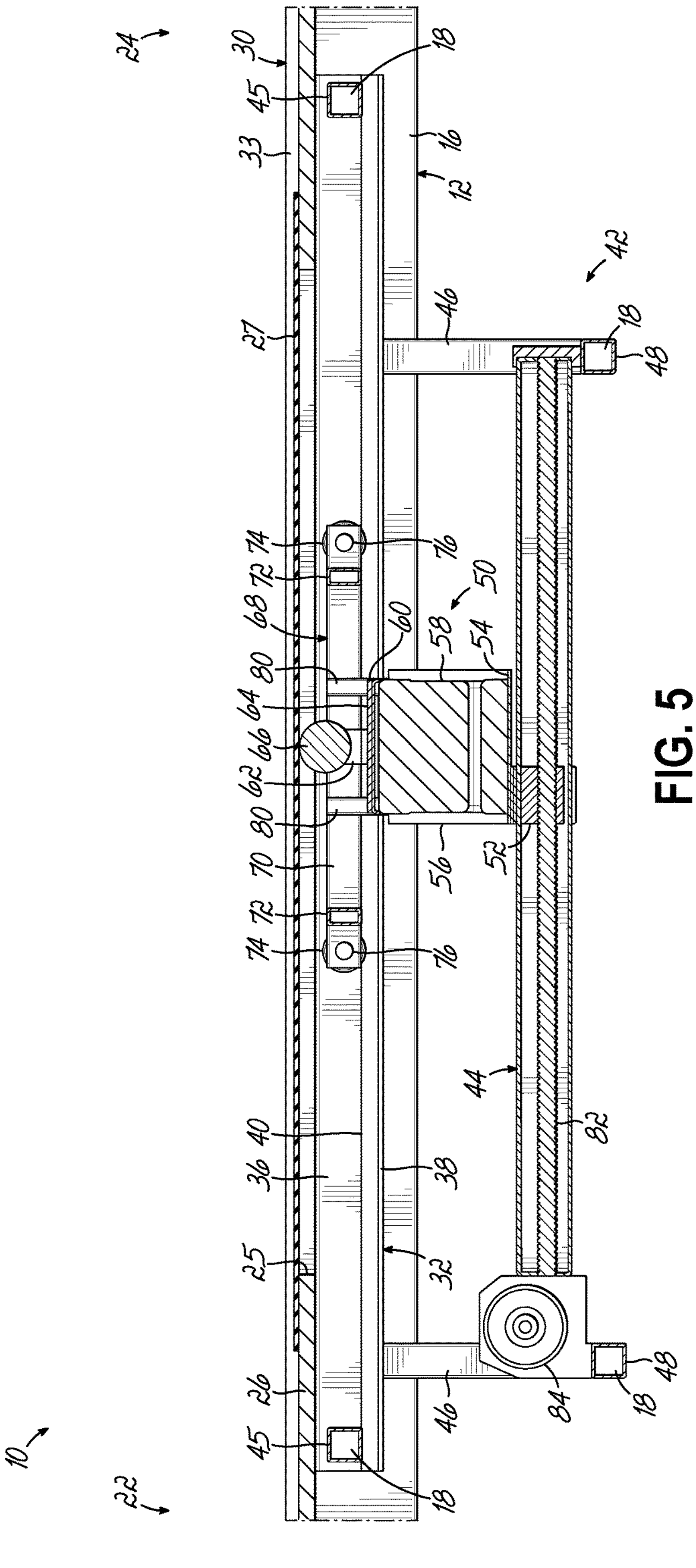
FIG. 5 is a schematic cross-sectional view taken along the line 5-5 of FIG. 1 showing the roller in a lowered position.

As best shown in FIG. 2, a rigid platform 26 is secured to the generally rectangular frame 12 in any known manner. As best shown in FIGS. 4 and 5, the rigid platform 26 has a larger footprint than the generally rectangular frame 12 and extends outwardly from the perimeter of the generally rectangular frame 12 on all four sides. As best shown in FIG. 6, the rigid platform 26 has a perimeter edge 28 about which is placed a protective shroud 30. As best shown in FIG. 2, the protective shroud 30 comprises four pieces joined together at the corners using any known method: two end pieces 31 of the same length and two side pieces 33 of a different, greater length.

The rigid platform 26 is typically made of wood but may be made of any known material. The protective shroud 30 may be made of rubber, plastic, or any soft material. One purpose of the protective shroud 30 to protect users from contacting the perimeter edge 28 of the rigid platform 26 to prevent injuries.

Figure 5A:
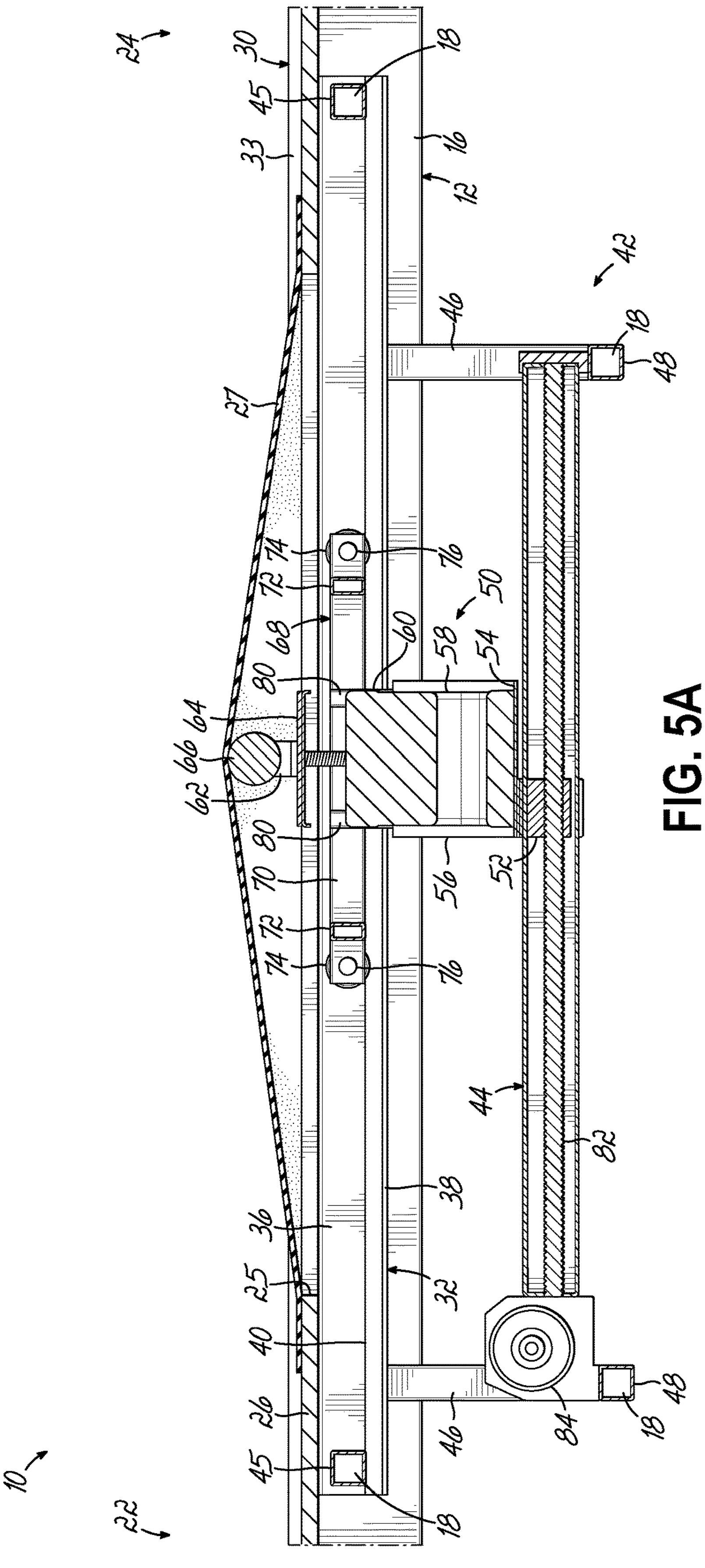
FIG. 5A is a cross-sectional view like FIG. 5 showing the roller in a raised position.
Figure 5B:
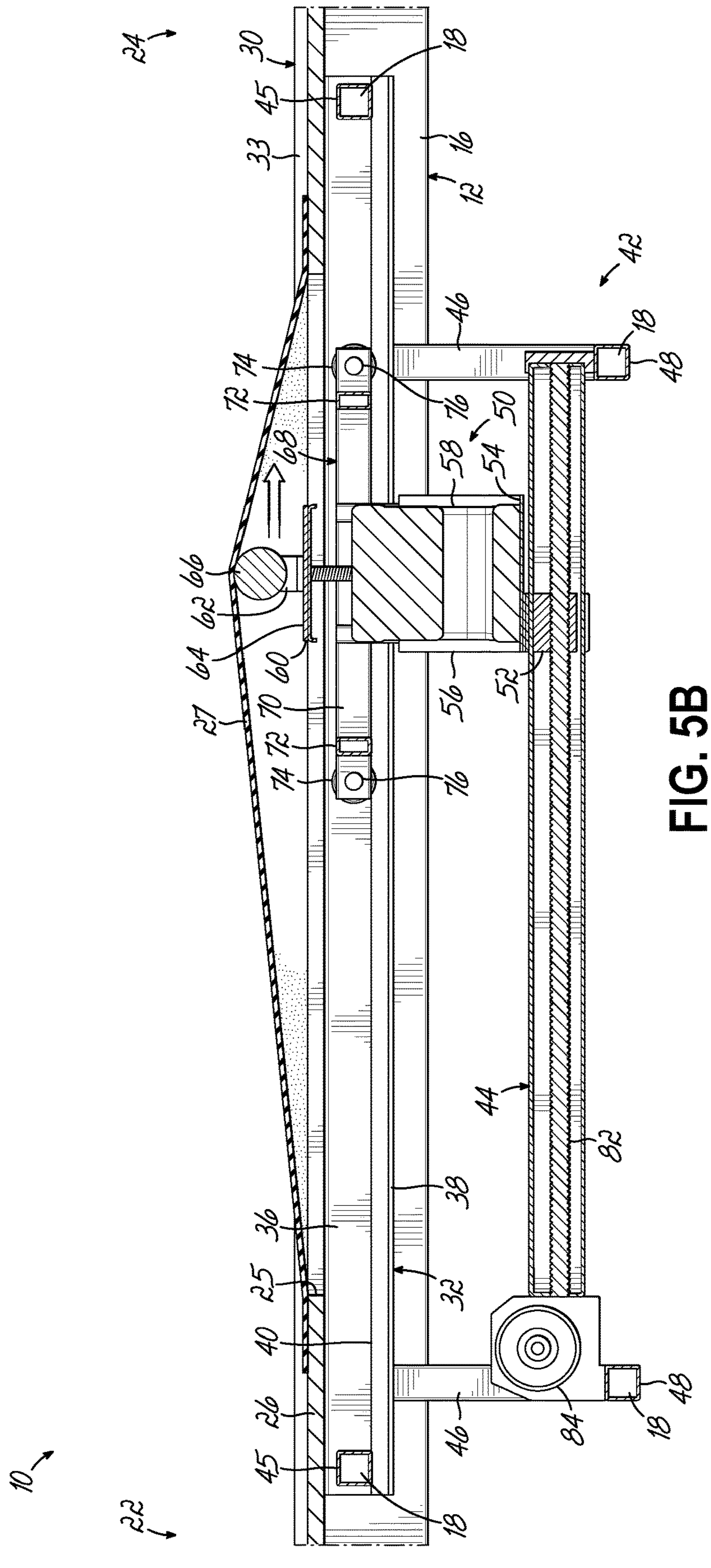
FIG. 5B is a cross-sectional view like FIG. 5 showing the roller in a raised position and moving rearward from its position shown in FIG. 5A.
Figure 5C:
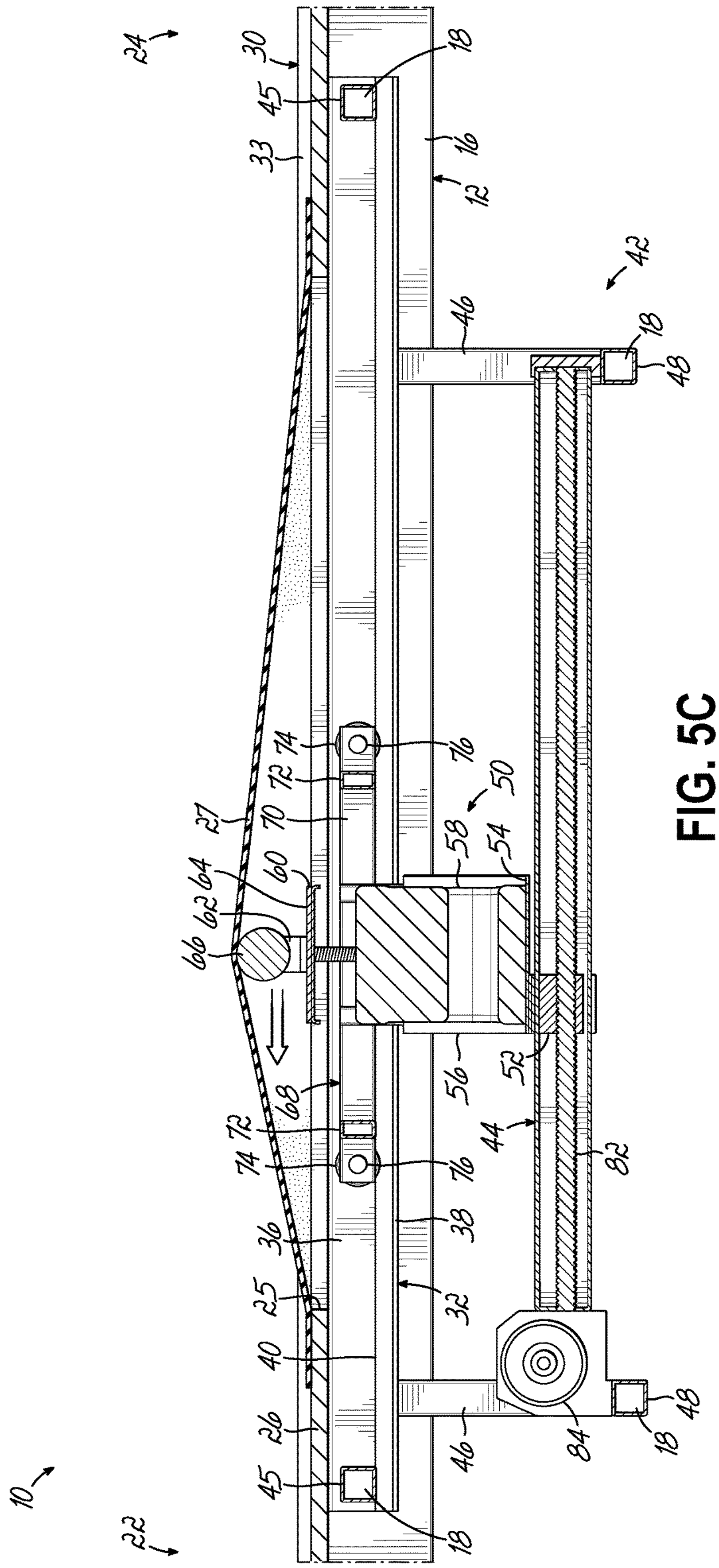
FIG. 5C is a cross-sectional view like FIG. 5 showing the roller in a raised position and moving forward from its position shown in FIG. 5A.

As best shown in FIG. 2, the rigid platform 26 has a rectangular opening 25 covered by a cover 27. The cover 27 may be secured to the rigid platform 26. The cover 27 may be made of any durable fabric which is elastic enough to stretch a bit as shown in FIGS. 5A-5C yet strong enough to withstand the pressure and friction caused by movement of the roller 66. Although the drawings illustrate a rectangular opening 25 of a certain size, the drawings are not intended to be limiting. The opening in the rigid platform may be any desired size and shape.

As best shown in FIG. 2, the bedding foundation 10 further comprises a lift mechanism 42 removably secured to the rigid platform 26. More particularly, the lift mechanism 42 is secured to the rigid platform 26 using two parallel roller rails 32 secured to the rigid platform 26 in any known manner including fasteners (not shown) passing through openings 35 in the roller rails 32 and through the rigid platform 26. See FIG. 3.

Figure 3:
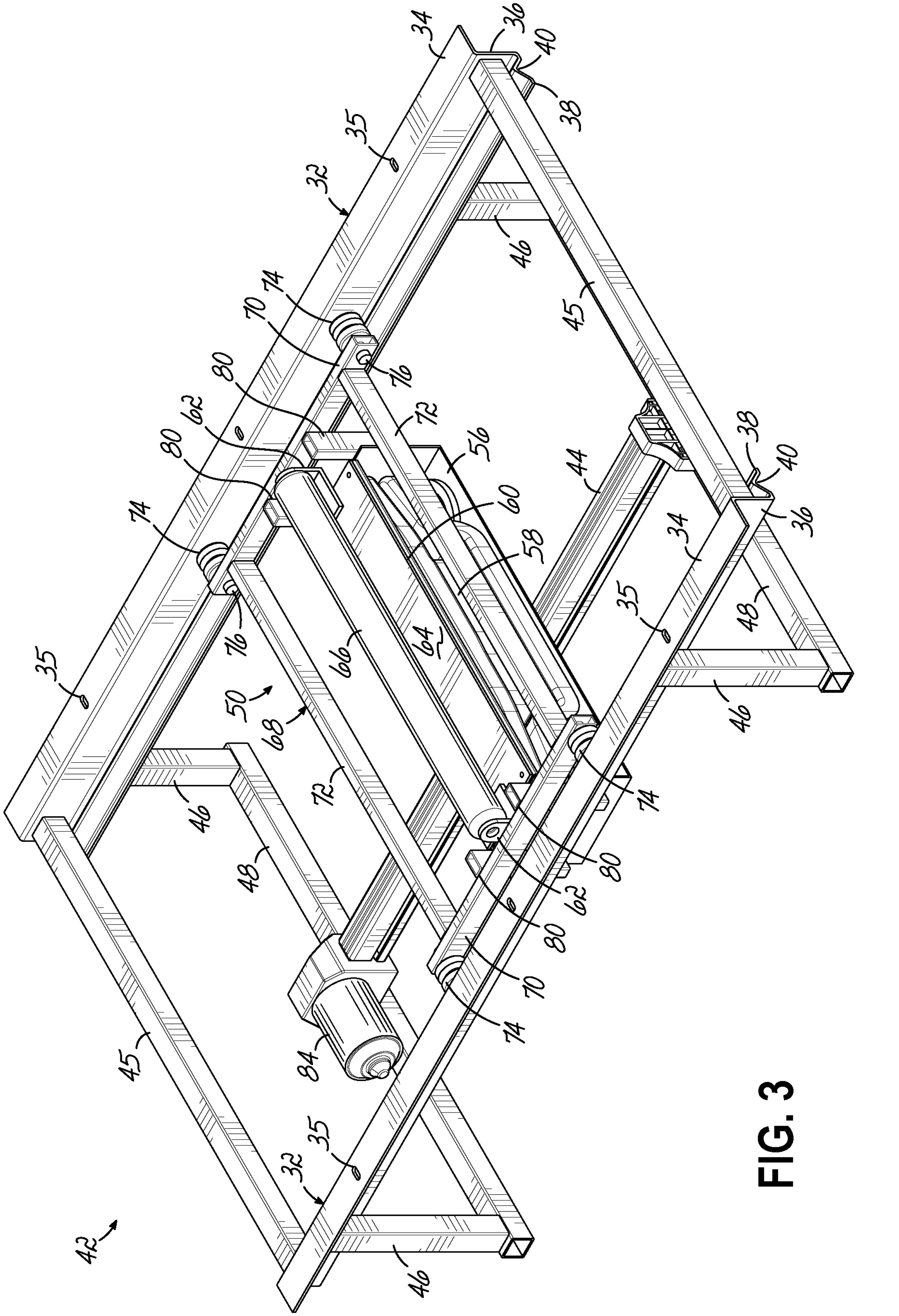
FIG. 3 is an enlarged perspective view of the lift mechanism of the bedding foundation of FIG. 1.

FIG. 3 illustrates a closer view of the lift mechanism 42. As best shown in FIG. 3, each roller rail 32 is a unitary member have a horizontally oriented mounting flange 34, a connecting portion 36 extending downwardly from an inner edge of the mounting flange 34 and an inverted V-shaped lower portion 38 extending inwardly from the lower edge of the connecting portion 36. The inverted V-shaped lower portion 38 has a rounded apex 40 which is the uppermost portion of the inverted V-shaped lower portion 38. Although one shape of roller rail is illustrated, the roller rail of the present invention may assume other shapes. Although each roller rail 32 is typically made of metal, it may be made of any desirable material. One purpose of the roller rails 32 is to guide movement of the movable roller carriage 50 described below. Although one type of interaction between the wheels of the roller carriage 50 and the roller rails 32 is illustrated, other know interactions are within the purview of the present invention.

As best shown in FIG. 3, the lift mechanism 42 of the bedding foundation 10 further comprises a pair of hollow stabilizers 45 welded or otherwise secured to the ends of the roller rails 32 of the lift mechanism 42 and extending therebetween. As best shown in FIG. 3, the lift mechanism 42 of the bedding foundation 10 further comprises a pair of hollow uprights 46 per side welded or otherwise secured to the roller rails 32 of the lift mechanism 42 and extending downwardly therefrom. The lift mechanism 42 further comprises two hollow cross members 48, each hollow cross member 48 extending between two hollow uprights 46. The two front uprights 46 have a hollow cross member 48 extending therebetween and the two rear uprights 46 have another hollow cross member 48 extending therebetween. The hollow cross members 48 may be welded or otherwise secured to the hollow uprights 46 in any conventional fashion. A motorized linear actuator 44 is secured to the hollow cross members 48 and extends therebetween, from front to back in the bedding foundation. Although any linear actuator may be used one that has proven satisfactory is a Richmat Item Number HJA61S available at http://www.richmat.com.

As best seen in FIG. 3, the linear actuator 44 moves a roller carriage 50 in a linear direction from front to back in the bedding foundation 10. As best seen in FIG. 5, the linear actuator 44 includes a bus 52 which is the part of the linear actuator 44 and moves linearly due to rotation of a threaded rod 82 rotated by a motor 84, which is conventional for a linear actuator. A roller tray bracket 54 is secured to the bus 52. The roller tray bracket 54 secures the linear actuator 44 to the roller carriage 50. As best seen in FIG. 4, the roller carriage 50 includes a roller tray 56 inside which is a lifter or lift actuator 58. As best seen in FIG. 6, the roller tray 56 has a generally U-shape cross-sectional configuration. Although any lift actuator may be used, one that has proven satisfactory is a Linak product Item number BASE1000A0F100100 available at http://www.linak.com.

The lifter 58 is secured in the roller tray 56 of the roller carriage 50 and functions to raise and lower a lifter plate 60. Two generally L-shaped roller mounting brackets 62 are secured to the upper surface 64 of the lifter plate 60. The lifter plate 60 is best shown in FIG. 3. A roller 66 extends between the generally L-shaped roller mounting brackets 62. The roller 66 is sized to fit through the opening 25 in the rigid platform 26.

As best shown in FIG. 3, the roller carriage 50 further comprises a chassis 68 comprising two hollow side members 70 and two hollow connecting members 72. Each hollow connecting member 72 extends between the hollow side members 70. As best shown in FIG. 3, the roller carriage 50 further comprises four wheels 74, each wheel 74 being rotatably mounted on a wheel pin 76. Each wheel pin 76 extends through at least a portion of one of the hollow side members 70 of the chassis 68 of the roller carriage 50. As best shown in FIG. 6, each wheel 74 has a groove 78 therein adapted to receive the rounded apex 40 of the inverted V-shaped lower portion 38 of one of the roller rails 32.

As best shown in FIG. 3, the chassis 68 of the roller carriage 50 further comprises four hollow stubs 80, two per side. Each hollow stub 80 is welded or otherwise secured at its upper end to one of the hollow side members 70 of the chassis 68 of the roller carriage 50 and is welded or otherwise secured at its lower end to the roller tray 56 of the roller carriage 50.

FIGS. 5A-5C illustrate the method of providing a massaging feeling to a mattress using a lift mechanism 42 built into a bedding foundation 10. FIG. 5A illustrates the roller 66 in its lowered or down position as determined by the lifter 58. The position of roller carriage 50 and its roller 66 is further determined by the position of the bus 52 of the linear actuator 44. The linear actuator 44 and the lifter 58 may be controlled remotely (wirelessly) or via a wired connection.

FIG. 5B illustrates the roller carriage 50 being moved rearwardly from its position shown in FIG. 5A with the roller 66 in its raised or up position as determined by the lifter 58. The roller carriage 50 may continue to move rearwardly until the bus 52 of the linear actuator 44 reaches the back end of the threaded rod 82 of the linear actuator 44.

FIG. 5C illustrates the roller carriage 50 being moved forwardly from its position shown in FIG. 5B, the roller 66 remaining in its raised or up position as determined by the lifter 58. The roller carriage 50 may continue to move forwardly until the bus 52 of the linear actuator 44 reaches the front end of the threaded rod 82 of the linear actuator 44. During either forward or rearward movement of the roller carriage 50, the grooved wheels 74 move along the roller rails 32 of the lift mechanism 42. As best shown in FIG. 6, the rounded apex 40 of each roller rail 32 remains in the groove 78 of each wheel 74 during movement of the roller carriage 50, regardless of the vertical position of the roller 60.

Figure 7A:
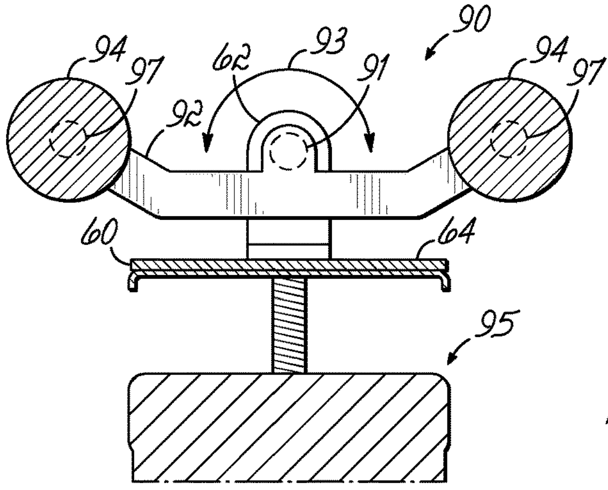
FIG. 7A is a schematic cross-sectional view of another embodiment of massager which may be substituted for a single roller.

FIG. 7A illustrates another embodiment of massager 90 which may be used in a lift mechanism 95, like lift mechanism 42 shown and described herein. As in lift mechanism 42, lift mechanism 95 comprises two generally L-shaped roller mounting brackets 62 (only one shown in FIG. 7A) secured to the upper surface 64 of the lifter plate 60. Instead of a roller extending between the generally L-shaped roller mounting brackets 62, a rocker bar 91 extends between the generally L-shaped roller mounting brackets 62. A rocker 92 pivots about the rocker 92 as shown by arrow 93. A roller 94 is attached to each end of the rocker 92 and is rotatable about a bar 97. The rocker 92 is sized to fit through the opening 25 in the rigid platform 26. Thus, the lift mechanism 95 has two rollers 94, each circular in cross-section. However, the rollers may have any desired cross-sectional configuration. The rollers 92 may be rotatable or not.

Figure 7B:
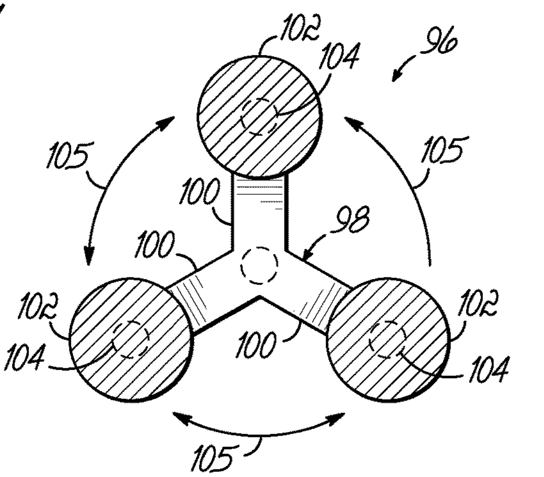
FIG. 7B is a schematic cross-sectional view of another embodiment of massager which may be substituted for a single roller.

FIG. 7B illustrates another embodiment of massager 96 which may be used in any lift mechanism shown and described herein. Massager 96 comprises a rotatable brace 98 having three arms 100. A rotatable roller 102 is mounted at the end of each arm 100 of rotatable brace 98 and is rotatable about a bar 104. As indicated by arrows 105, the rotatable brace 98 may rotate either clockwise or counter-clockwise.

Figure 7C:
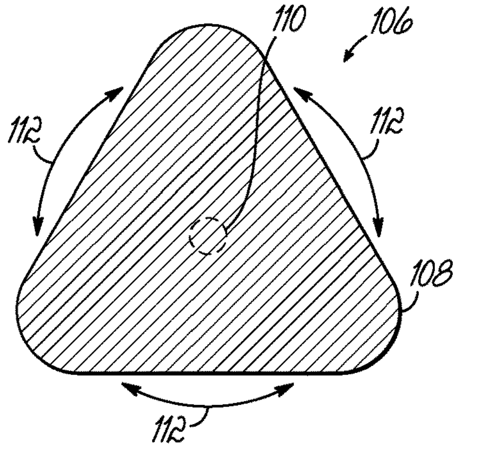
FIG. 7C is a schematic cross-sectional view of another embodiment of massager which may be substituted for a single roller having a round cross-section.

FIG. 7C illustrates another embodiment of massager 106 which may be used in any lift mechanism shown and described herein. Massager 106 comprises a rotatable generally triangular member 108 which is rotatable about a bar 110. As indicated by arrows 112, the rotatable member 108 may rotate either clockwise or counter-clockwise. The rotatable member 108 may take the place of roller 66 in the principal embodiment described herein.

Figure 7D:
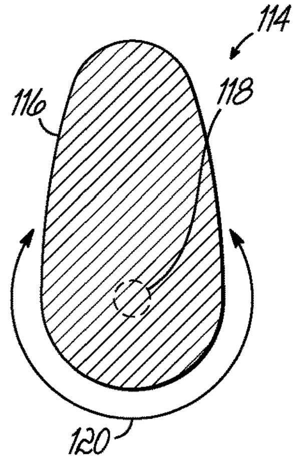
FIG. 7D is a schematic cross-sectional view of another embodiment of massager which may be substituted for a single roller having a round cross-section.

FIG. 7D illustrates another embodiment of massager 114 which may be used in any lift mechanism shown and described herein. Massager 114 comprises a rotatable generally oval shaped member 116 which is rotatable about a bar 118. As indicated by arrow 120, the rotatable oval shaped member 116 may rotate either clockwise or counter-clockwise. The rotatable oval shaped member 116 may take the place of roller 66 in the principal embodiment described herein.

Figure 7E:
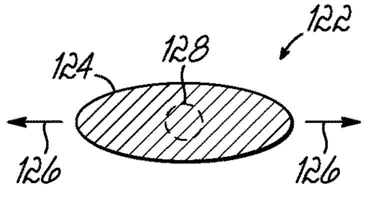
FIG. 7E is a schematic cross-sectional view of another embodiment of massager which may be substituted for a single rotatable roller having a round cross-section.

FIG. 7E illustrates another embodiment of massager 122 which may be used in any lift mechanism shown and described herein. Massager 122 comprises a non-rotatable generally oval shaped member 124 which is movable in a linear direction as indicated by arrows 126. The non-rotatable generally oval shaped member 124 is mounted on a bar 128. The non-rotatable generally oval shaped member 124 may take the place of roller 66 in the principal embodiment described herein.

Figure 7F:
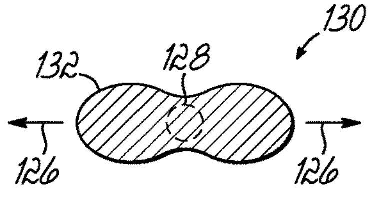
FIG. 7F is a schematic cross-sectional view of another embodiment of massager which may be substituted for a single rotatable roller having a round cross-section.

FIG. 7F illustrates another embodiment of massager 130 which may be used in any lift mechanism shown and described herein. Massager 130 comprises a non-rotatable generally peanut shaped member 132 which is movable in a linear direction as indicated by arrows 126. The non-rotatable generally peanut shaped member 132 is mounted on a bar 128. The non-rotatable generally peanut shaped member 132 may take the place of roller 66 in the principal embodiment described herein.

Figure 7G:
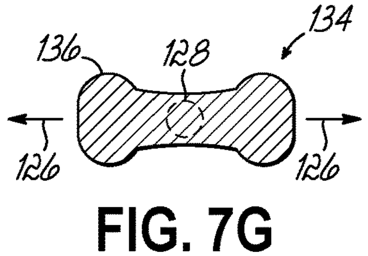
FIG. 7G is a schematic cross-sectional view of another embodiment of massager which may be substituted for a single rotatable roller having a round cross-section.

FIG. 7G illustrates another embodiment of massager 134 which may be used in any lift mechanism shown and described herein. Massager 134 comprises a non-rotatable generally dog bone shaped member 136 which is movable in a linear direction as indicated by arrows 126. The non-rotatable generally dog bone shaped member 136 is mounted on a bar 128. The non-rotatable generally dog bone shaped member 136 may take the place of roller 66 in the principal embodiment described herein.

Figure 8A:
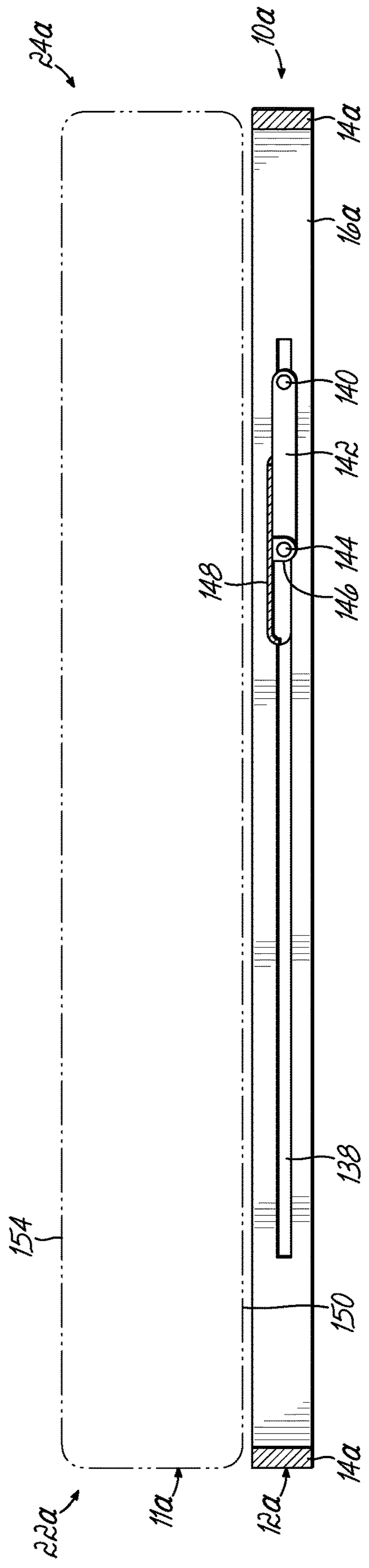
FIG. 8A is a schematic cross-sectional view of another embodiment of bedding foundation.
Figure 8B:
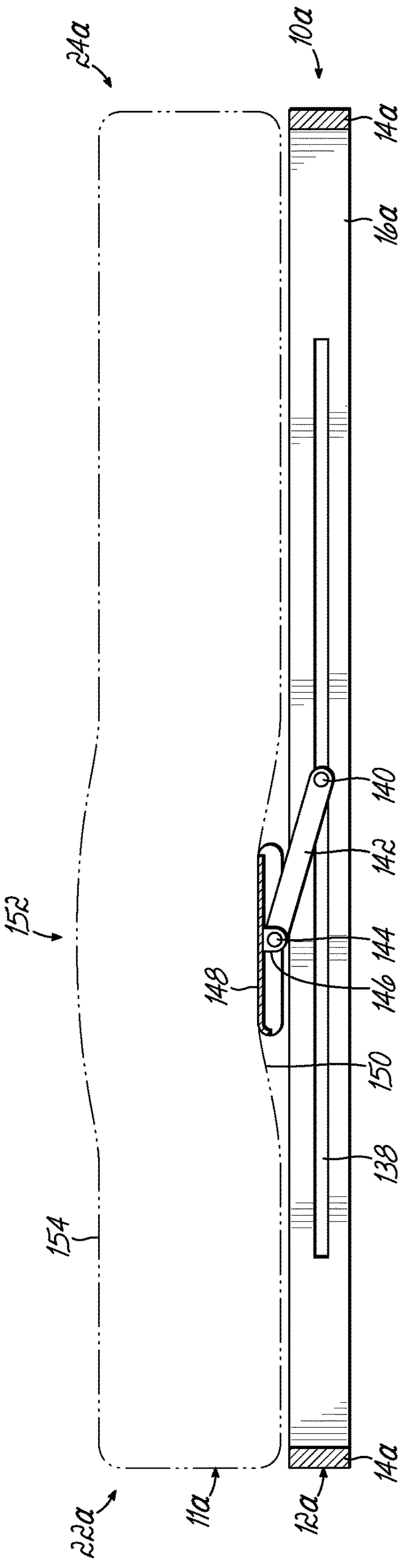
FIG. 8B is a schematic cross-sectional view of the embodiment of bedding foundation of FIG. 8A showing a massager in a raised position.

FIGS. 8A and 8B illustrate the operation of another embodiment of bedding foundation 10*a* with a mattress 11*a* shown above the bedding foundation 10*a*. Bedding foundation 10*a* comprises a generally rectangular frame 12*a* comprising two end rails 14*a* and two side rails 16*a*, only one being shown. Although not shown, legs may support the rectangular frame 12*a* above the ground a desired distance.

As best shown in FIG. 8B, each side rail 16*a* (only one being shown) has a linear slot 138 cut therein. A first pin 140 moves inside the linear slots 138 of the side rails 16*a* and extends therebetween. A lever 142 extends from the first pin 140 to a second pin 144 which extends between two bosses 146 of a platform 148. The platform 148 moves between a lowered position shown in FIG. 8A and a raised position shown in FIG. 8B in any known manner. When the platform 148 is in its raised position, it exerts an upward force on the lower surface 150 of mattress 11*a* causing a bump or raised portion 152 in the upper surface 154 of mattress 11*a*, as shown in FIG. 8B. As shown in FIG. 8A, when the platform 148 is in its lowered position, the platform 148 does not exert any upward force on the mattress 11*a* and upper surface of the mattress 11*a* is generally planar.

For purposes of this document, the head end of the bedding foundation 10*a* will be indicated by the numeral 22*a* while the foot end of the bedding foundation 10*a* will be indicated by the numeral 24*a*. FIG. 8B shows the platform 148 upstream from its position shown in FIG. 8B due to movement of the first pin 140. When the first pin 140 is in any position including positions not shown, the lever 142 may be raised to raise the second pin 144, bosses 146 and platform 148. The drawings are not intended to be limiting. The first pin 140 may be moved upstream or downstream regardless of the position of the lever 142, second pin 144 and platform 146. Similarly, the platform 146 may be raised and lowered regardless of the position of the first pin 140.

Figure 9A:
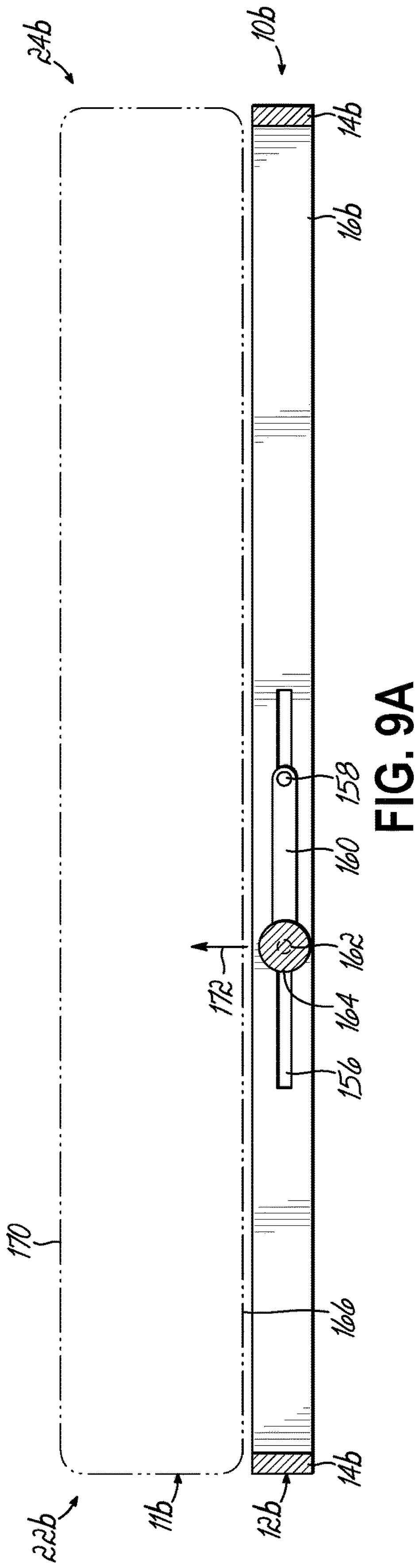
FIG. 9A is a schematic cross-sectional view of another embodiment of bedding foundation.
Figure 9B:
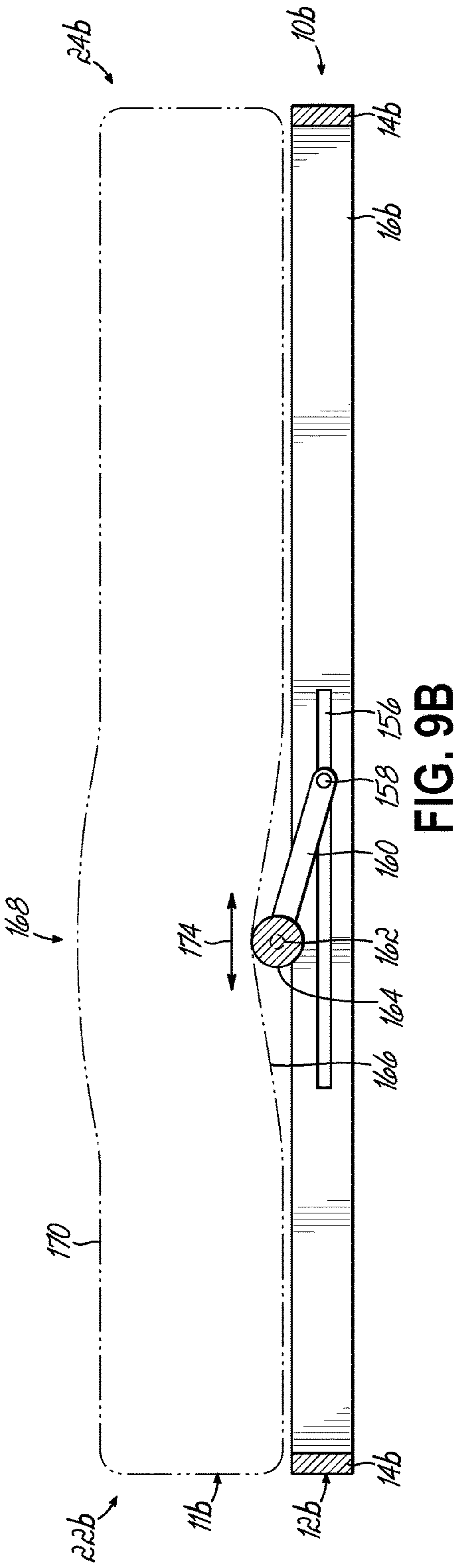
FIG. 9B is a schematic cross-sectional view of the embodiment of bedding foundation of FIG. 9A showing a massager in a raised position.

FIGS. 9A and 9B illustrate the operation of another embodiment of bedding foundation 10*b* with a mattress 11*b* shown above the bedding foundation 10*b*. Bedding foundation 10*b* comprises a generally rectangular frame 12*b* comprising two end rails 14*b* and two side rails 16*b*, only one being shown. Although not shown, legs may support the rectangular frame 12*b* above the ground a desired distance.

As best shown in FIG. 9B, each side rail 16*b* (only one being shown) has a linear slot 156 cut therein. A first pin 158 moves inside the linear slots 156 of the side rails 16*b* and extends therebetween. A lever 160 extends from the first pin 158 to a second pin 162. A roller 164 surrounds the second pin 162. The roller 164 may be rotatable or not. The roller 164 moves between a lowered position shown in FIG. 9A and a raised position shown in FIG. 9B in any known manner. When the roller 164 is in its raised position, the roller 164 exerts an upward force on the lower surface 166 of mattress 11*b* causing a bump or raised portion 168 in the upper surface 170 of mattress 11*b*, as shown in FIG. 9B. As shown in FIG. 9A, when the roller 164 is in its lowered position, the roller 164 does not exert any upward force on the mattress 11*a* and upper surface 170 of the mattress 11*b* is generally planar.

For purposes of this document, the head end of the bedding foundation 10*b* will be indicated by the numeral

22*b* while the foot end of the bedding foundation 10*b* will be indicated by the numeral 24*b*. FIG. 9B shows the roller 164 downstream from its position shown in FIG. 9B due to movement of the lever 160, the first pin 158 remaining in the same position. When the first pin 158 is in any position including positions not shown, the lever 160 may be raised to raise the second pin 162 and roller 164. The drawings are not intended to be limiting.

As shown in FIG. 9A, the roller 164 may be raised in the direction of arrow 172 by the lever 160 pivoting about first pin 158 by any known mechanism. When the roller 164 is in a raised position (shown or not shown), the first pin 158 may be moved upstream or downstream as shown by the arrow 174. The first pin 158 may be moved upstream or downstream regardless of the position of the lever 160, second pin 162 and roller 164. Similarly, the roller 164 may be raised and lowered regardless of the position of the first pin 158.

Figure 10A:
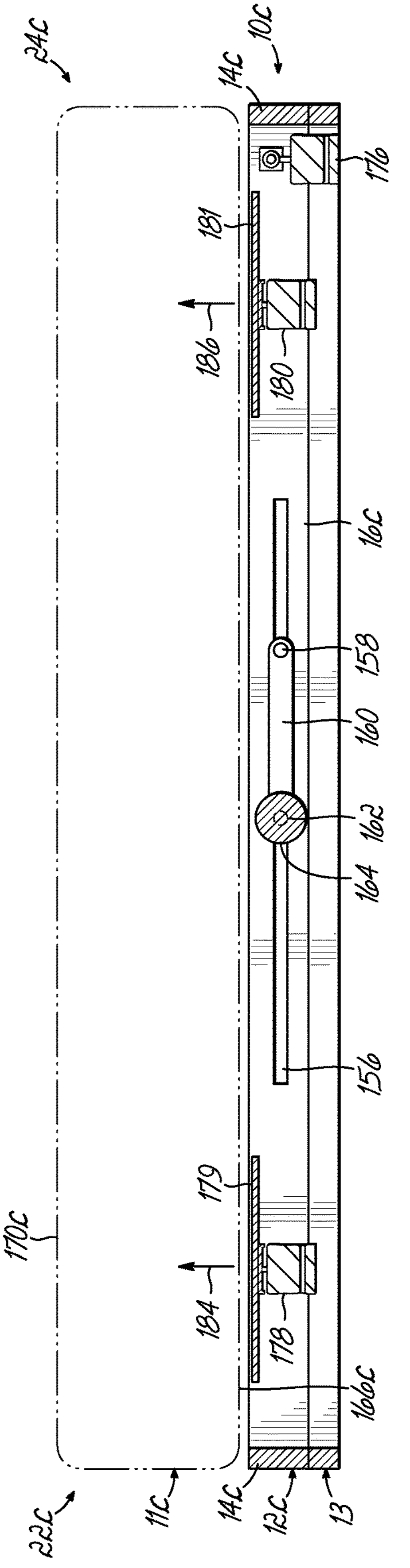
FIG. 10A is a schematic cross-sectional view of another embodiment of bedding foundation.
Figure 10B:
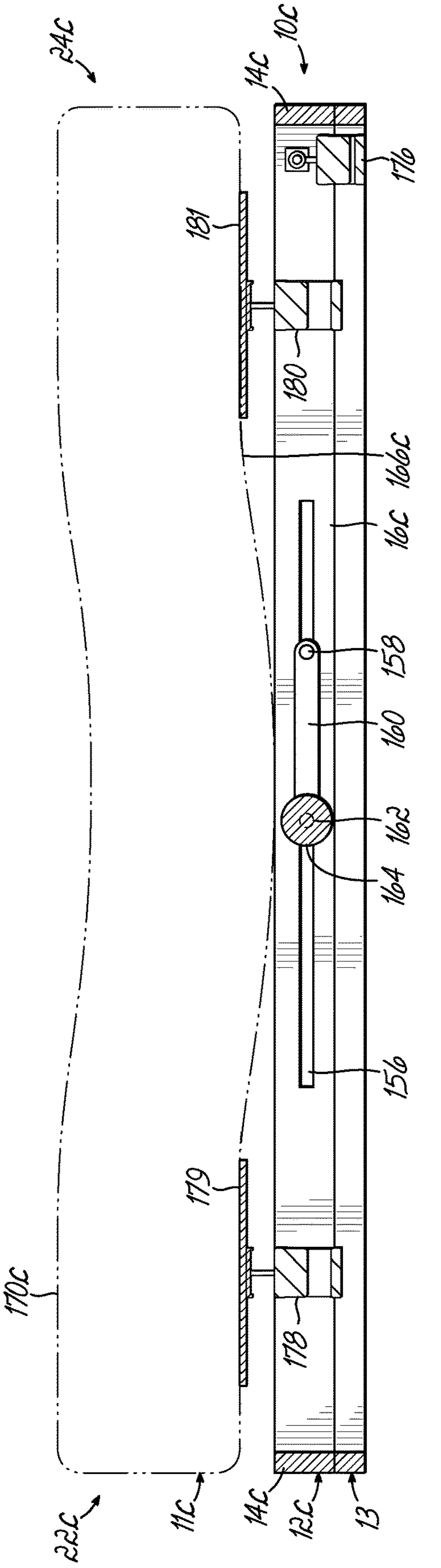
FIG. 10B is a schematic cross-sectional view of the embodiment of bedding foundation of FIG. 10A showing lifters on opposite sides of a massager, the lifters being raised to a raised position.
Figure 10C:
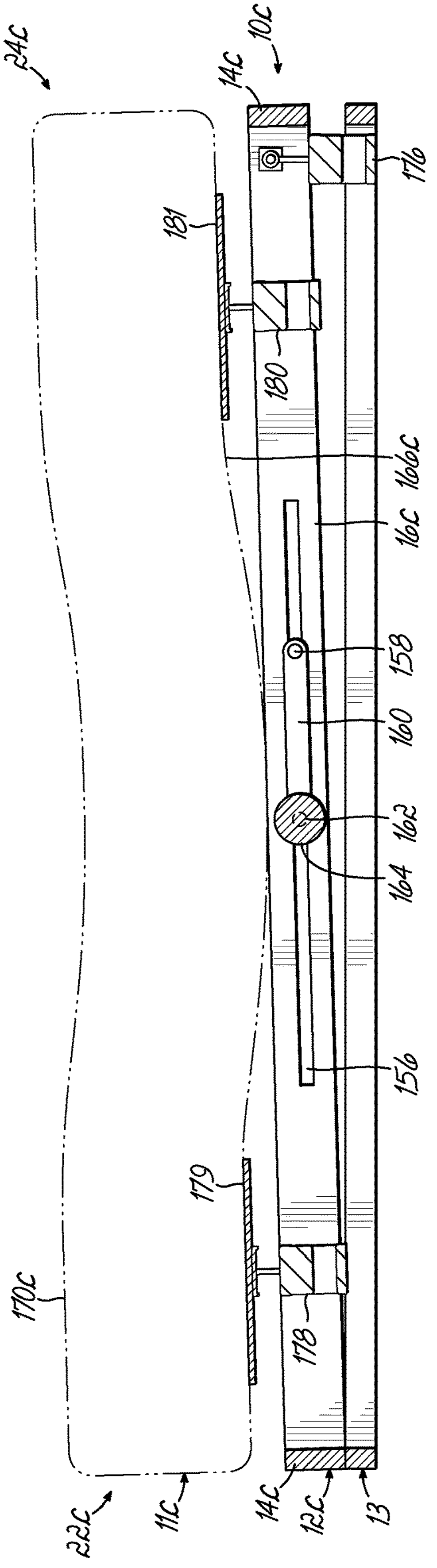
FIG. 10C is a schematic cross-sectional view of the embodiment of bedding foundation of FIG. 10A showing the lifters being in a raised position and the frame being inclined.

FIGS. 10A-10C illustrate the operation of another embodiment of bedding foundation 10*c* with a mattress 11*c* shown above the bedding foundation 10*c*. For purposes of this document, the head end of the bedding foundation 10*c* will be indicated by the numeral 22*c* while the foot end of the bedding foundation 10*c* will be indicated by the numeral 24*c*.

Bedding foundation 10*c* comprises a generally rectangular frame 12*c* comprising two end rails 14*c* and two side rails 16*c*, only one being shown. Although not shown, legs may support the rectangular frame 12*c* above the ground a desired distance. The generally rectangular frame 12*c* is shown resting on a generally rectangular base 13 which is stationary regardless of the position of the generally rectangular frame 12*c*.

The generally rectangular frame 12*c* is movable between a lowered position shown in FIGS. 10A and 10B and an inclined position shown in FIG. 10C via operation of a lift mechanism 176. Although FIGS. 10A-10C illustrate the lift mechanism 176 proximate the foot end 24*c* of the bedding foundation 10*c*, another lift mechanism (not shown) may be located at the head end 22*c* of the bedding foundation 10*c* to incline the head end 22*c* of the bedding foundation 10*c*. As illustrated in FIG. 10C, the lift mechanism 176 inclines the foot end 24*c* of the bedding foundation 10*c* relative to the head end 22*c* of the bedding foundation 10*c*.

As best shown in FIG. 10A, each side rail 16*b* (only one being shown) has a linear slot 156 cut therein. A first pin 158 moves inside the linear slots 156 of the side rails 16*c* and extends therebetween. A lever 160 extends from the first pin 158 to a second pin 162. A roller 164 surrounds the second pin 162. The roller 164 may be rotatable or not. The roller 164 moves between a lowered position shown in FIG. 9A and a raised position shown in FIG. 9B in any known manner. FIGS. 10A-10C show the roller 164 in a lowered position. When the roller 164 is in its raised position, the roller 164 exerts an upward force on the lower surface 166*c* of mattress 11*c* causing a bump or raised portion (not shown) in the upper surface 170*c* of mattress 11*c*, like shown in the mattress 11*b* of FIG. 9B. As shown in FIG. 10A, when the roller 164 is in its lowered position, the roller 164 does not exert any upward force on the mattress 11*c* and upper surface 170*c* of the mattress 11*c* is generally planar.

FIG. 10A shows a front lift actuator 178 in front of the roller 164 and a rear lift actuator 180 located behind the roller 164. A front platform 179 is secured to the top of the front lift actuator 178 and a rear platform 181 is secured to the top of the rear lift actuator 180. The front lift actuator 178 moves the front platform 179 between a lowered position shown in FIG. 10A and a raised position shown in FIGS. 10B and 10C. The rear lift actuator 180 moves the rear platform 181 between a lowered position shown in FIG. 10A and a raised position shown in FIGS. 10B and 10C. The front lift actuator 178 is operated independently from the rear lift actuator 180 although each drawing shows them in the same position. For example, the front lift actuator 178 may be in a raised position while the rear lift actuator 180 is in a lowered position.

The front lift actuator 178 may be raised and lowered regardless of the position of the roller 164. Similarly, the rear lift actuator 180 may be raised and lowered regardless of the position of the roller 164.

As shown by the arrow 184 shown in FIG. 10A, when the front lift actuator 178 is activated and the front platform 179 raised, the upper surface 170*c* of mattress 11*c* is raised at the front of the mattress 11*c*. As shown by the arrow 186 shown in FIG. 10A, when the rear lift actuator 180 is activated and the rear platform 181 raised, the upper surface 170*c* of mattress 11*c* is raised at the rear of the mattress 11*c*.

Figure 11:
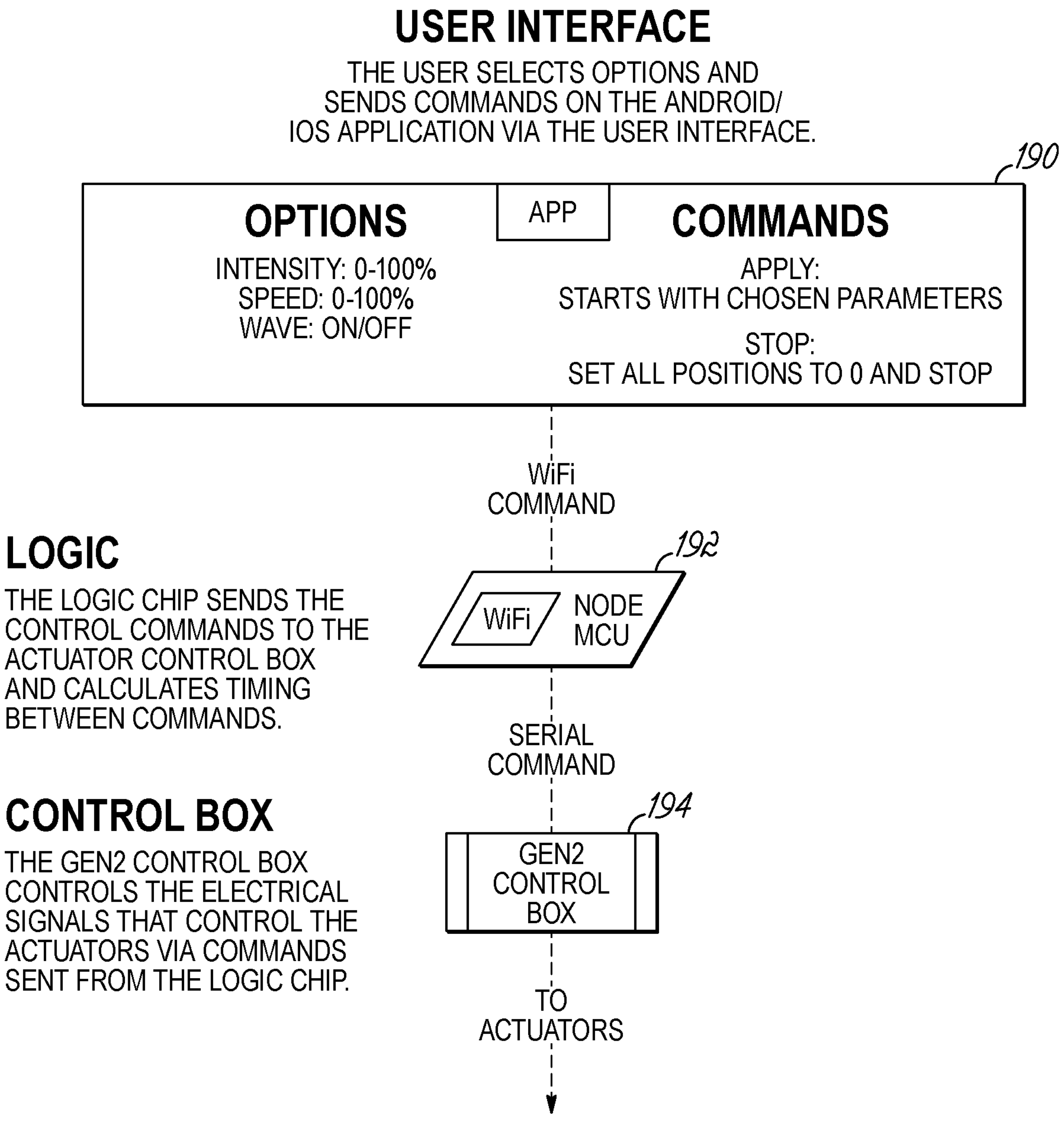
FIG. 11 is a flow chart showing the operation of one embodiment of the present invention.

FIG. 11 illustrates a flow chart showing the general operation of an adjustable bed in accordance with the present invention. FIG. 11 shows a user interface 190 such as an application on a mobile phone. An operator may manipulate the user interface to select an intensity of massage from zero to one hundred percent. The percentage of intensity chosen determines the height of the roller and thus the upward force exerted on the mattress above the adjustable bed. An operator may further manipulate the user interface to select a speed of travel of the roller from zero to one hundred percent. The percentage of speed chosen determines the speed of travel of the roller and thus the massage feeling exerted on the mattress above the adjustable bed. An operator may further turn a wave action on or off using the user interface 190.

Figure 12:
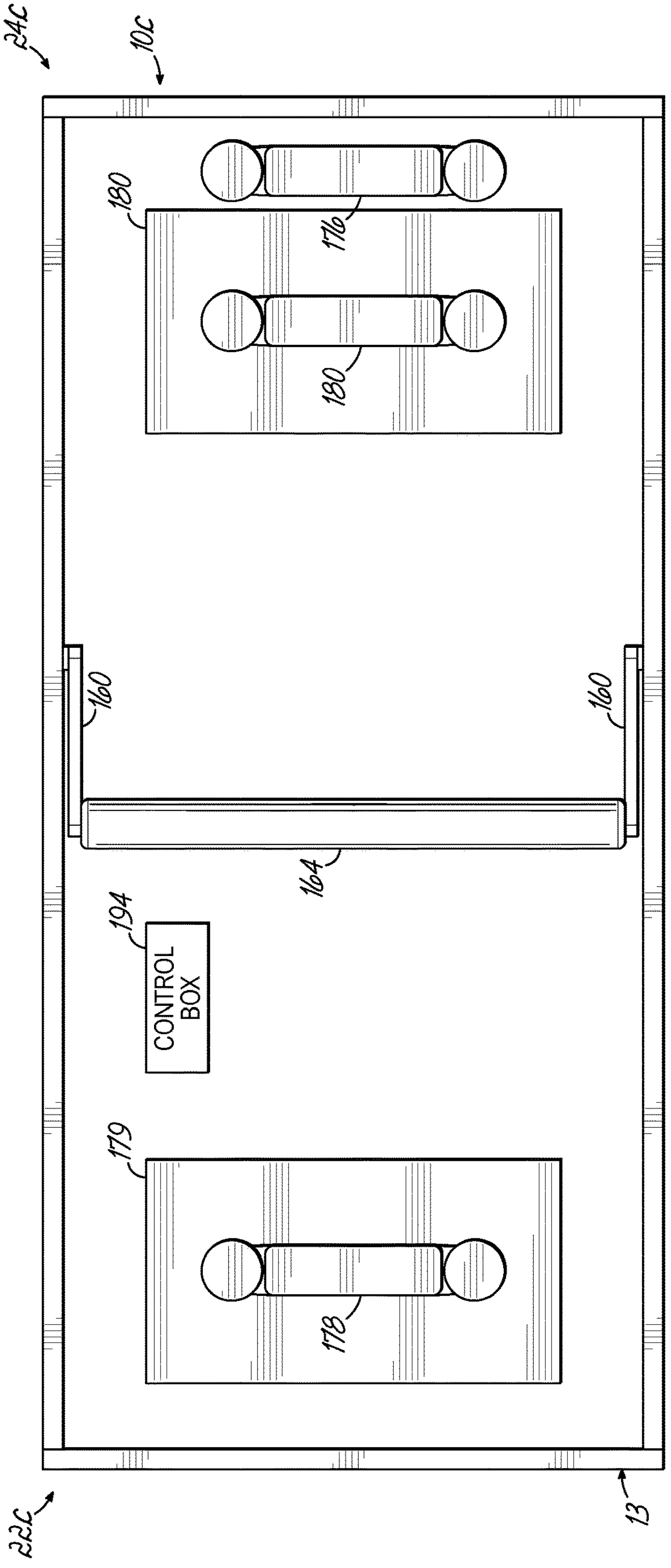
FIG. 12 is a bottom view of a bedding foundation in accordance with the present invention.

A logic chip sends the control commands to an actuator control box 192 and calculates the timing between commands. A logic chip 192 receives a Wi-Fi command from the user interface and issues a command to a control box 194. The control box 194 controls the electrical signals that control the actuators via commands sent from the logic chip. Although FIG. 12 shows the control box at a specific location, it may be located at any desired location.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof. The invention in its broader aspects is therefore not limited to the specific details and representative apparatus and methods shown and described. Departures may therefore be made from such details without departing from the spirit or scope of the general inventive concept. For example, the roller concept of the present invention may be used in an adjustable bed base. Any of the hollow members of the bedding foundation may be at least partially solid. The invention resides in each individual feature described herein, alone, and in all combinations of any and all of those features. Accordingly, the scope of the invention shall be limited only by the following claims and their equivalents.

What is claimed is:

1. A bedding foundation comprising: a generally rectangular frame made of hollow members supported by legs; a rigid platform supported by the generally rectangular frame, the rigid platform having a footprint larger than the generally rectangular frame and extending outwardly from the perimeter of the generally rectangular frame, the rigid platform further having an opening; a cover secured to the rigid platform and covering the opening in the rigid platform; roller rails secured to the rigid platform, each of the roller rails being a unitary member having a horizontally oriented mounting flange, a connecting portion extending downwardly from the horizontally oriented mounting flange and an inverted V-shaped lower portion extending inwardly from a lower edge of the connecting portion; hollow uprights secured to the roller rails and extending downwardly from the roller rails; hollow cross members secured to the uprights and extending therebetween a motorized linear actuator comprising a threaded rod rotated by a motor and a bus movable upon rotation of the threaded rod, the threaded rod extending between the cross members for moving the bus; a roller tray bracket secured to the bus; a roller carriage secured to the roller tray bracket and being moveable by the linear actuator, said roller carriage including a roller tray; a lifter inside the roller tray for lifting a lifter plate; two L-shaped roller mounting brackets directly secured to an upper surface of the lifter plate, one L-shaped roller mounting bracket being on each side of the lifter plate; a single roller extending between the roller mounting brackets; and four wheels, two per side for engaging the roller rails and guiding movement of the roller carriage, wherein said roller of the roller carriage is movable in a horizontal direction by the linear actuator and movable in a vertical direction by the lifter.

2. The bedding foundation of claim 1, further comprising a protective shroud surrounding the rigid platform.

3. The bedding foundation of claim 1, wherein each of the wheels has a groove therein adapted to receive the inverted V-shaped lower portion of one of the roller rails.

4. The bedding foundation of claim 1, wherein the roller moves with the carriage.

5. The bedding foundation of claim 4, wherein the lifter moves with the carriage.

6. The bedding foundation of claim 1, further comprising:

a user interface;

a control box; and a logic chip which receives a command from the user interface and issues a command to the control box, wherein the control box controls electronic signals which control the motorized linear actuator and lifter via commands sent from the logic chip.

7. A bedding foundation comprising: a frame supported by legs; a rigid platform supported by the generally rectangular frame, the rigid platform having a footprint larger than the generally rectangular frame and extending outwardly from the perimeter of the generally rectangular frame, the rigid platform further having an opening; a flexible cover covering the opening in the rigid platform; a lift mechanism suspended by the rigid platform; the lift mechanism comprising roller rails mounted to the rigid platform, each of the roller rails being a unitary member having an inverted V-shaped portion; the lift mechanism further comprising a motorized linear actuator underneath the rigid platform, the motorized linear actuator comprising a motor for rotating a threaded rod and a bus movable via rotation of the threaded rod and a roller carriage operatively coupled to the bus of the motorized linear actuator, said roller carriage including a roller tray and a chassis; a lifter inside the roller tray for lifting a lifter plate; two L-shaped roller mounting brackets directly secured to an upper surface of the lifter plate, one L-shaped roller mounting bracket being on each side of the lifter plate; a single roller extending between the roller mounting brackets; wheels secured to the chassis and engaging the roller rails for guiding movement of the roller carriage; wherein the roller of the roller carriage is sized to fit through the opening in the rigid platform and movable in a horizontal direction by the linear actuator and movable in a vertical direction by the lifter.

8. The bedding foundation of claim 7, wherein the flexible cover is secured to the rigid platform.

9. The bedding foundation of claim 7, wherein the lift mechanism comprises uprights secured to the roller rails and cross members secured to the uprights and extending therebetween.

10. The bedding foundation of claim 7, wherein the opening in the rigid platform is rectangular.

11. The bedding foundation of claim 7, wherein each of the wheels has a groove therein adapted to receive the inverted V-shaped portion of one of the roller rails.

12. The bedding foundation of claim 7, wherein the chassis of the roller carriage comprises two side members and two connecting members extending between the side members, each of the wheels being mounted on a wheel pin extending through one of the side members of the chassis.

13. The bedding foundation of claim 12, wherein the chassis further comprises stubs connecting the side members of the chassis to the roller tray.

14. The bedding foundation of claim 7, further comprising:

a user interface comprising an application on a mobile phone;

a control box; and a logic chip which receives a Wi-Fi command from the user interface and issues a command to the control box, wherein the control box controls electronic signals which control the motorized linear actuator and lifter via commands sent from the logic chip.

15. A method of providing a massaging feeling to a mattress from a lift mechanism built into a bedding foundation, the method comprising: raising a single roller though an opening in a rigid platform using a lifter, the roller remaining below a flexible cover covering the opening in the rigid platform, the rigid platform being supported by a generally rectangular frame supported by legs, the rigid platform having a footprint larger than the generally rectangular frame and extending outwardly from the perimeter of the generally rectangular frame; moving the roller from front to back inside the opening with the roller in its raised position by activating a linear actuator, the linear actuator comprising a motor for rotating a threaded rod, the threaded rod extending between cross members extending between uprights mounted to roller rails, the uprights extending downwardly from the roller rails and the cross members being below the rigid platform, the roller rails being mounted to the rigid platform, the linear actuator horizontally moving a bus, a roller tray bracket secured to the bus, and a roller tray of a roller carriage secured to the roller tray bracket, the roller carriage further comprising wheels engaging the roller rails for guiding movement of the roller carriage; wherein the lifter is inside the roller tray and lifts a lifter plate and two L-shaped roller mounting brackets directly secured to the lifter plate when activated, the roller extending between the roller mounting brackets, wherein each of the L-shaped roller mounting brackets has a planar portion secured to the lifter plate.

16. The method of claim 15, wherein the wheels have grooves in which remain inverted V-shaped portions of the roller rails upon horizontal movement of the roller carriage.

17. The method of claim 16, wherein each of the wheels is rotatably supported by a wheel pin extending through one of the side members of a chassis which is part of the roller carriage.

18. The method of claim 15, wherein the lifter and linear actuator function independently.

19. The method of claim 15, wherein the wheels remain contacting the roller rails regardless of the position of the lifter and the roller carriage.

20. The method of claim 15, wherein the lifter moves with the roller carriage.

21. The method of claim 15, wherein the linear actuator and lifter are activated by electrical signals sent from a logic chip inside a control box, the logic chip receiving electrical signals from a user interface.

* * * * *